Patented June 23, 1931

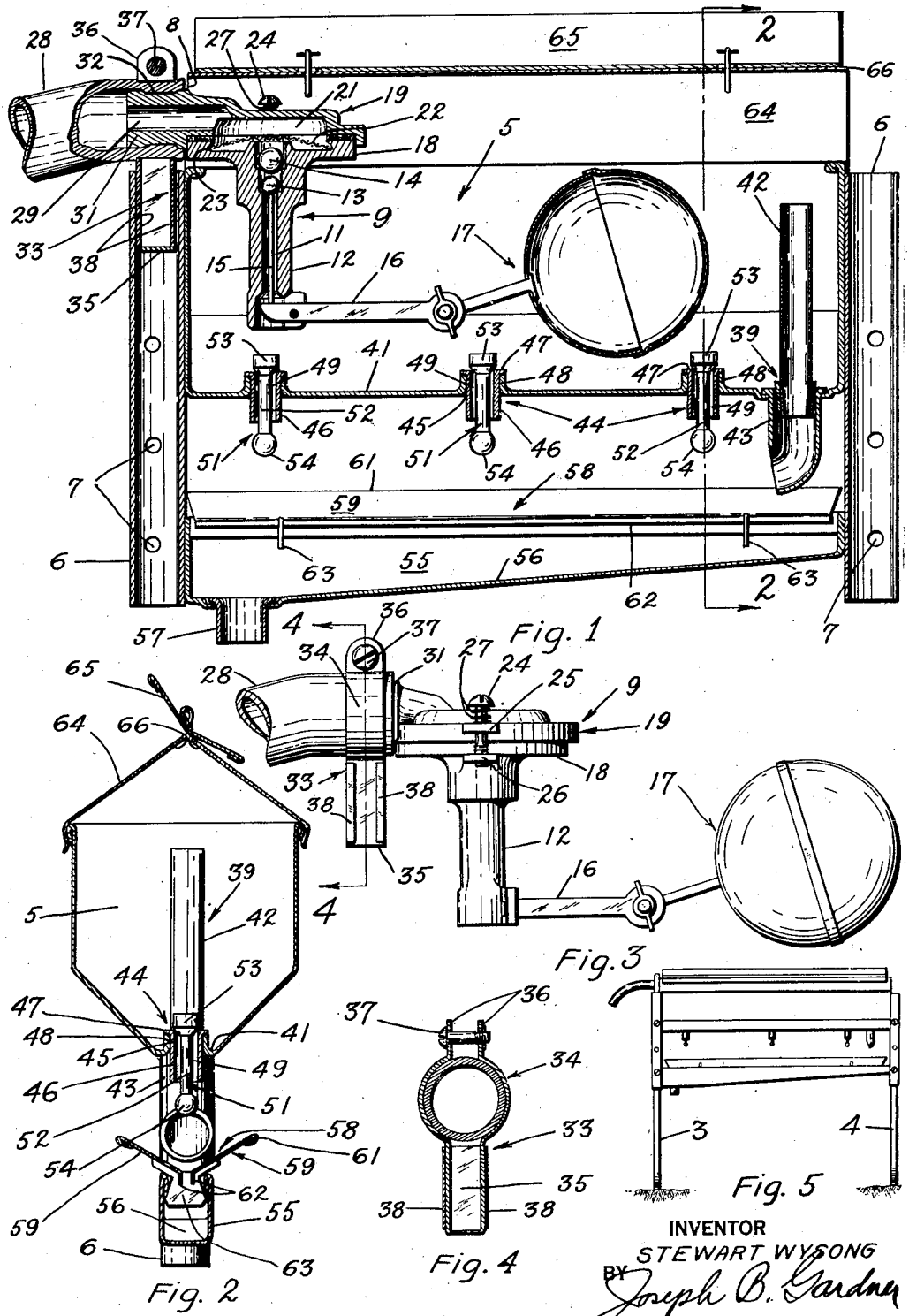

1,811,375

UNITED STATES PATENT OFFICE

STEWART WYSONG, OF OAKLAND, CALIFORNIA, ASSIGNOR OF ONE-HALF TO
C. W. HENDRICKSON, OF OAKLAND, CALIFORNIA

POULTRY DRINKING FOUNTAIN

Application filed August 17, 1929. Serial No. 386,610.

The invention relates to a watering device particularly adapted for use by poultry.

An object of the invention is to provide a watering device of the character described which will permit the poultry to obtain a drink without requiring them to incline their beaks downwardly during the drinking operation.

A further object of the invention is to provide a device of the character described wherein each bird may be watered individually.

A further object is to provide a drinking fountain in which at no time will the water contained therein be exposed prior to being drunk by the poultry.

Another object of the invention is to provide a device of the character described having a plurality of normally closed spouts arranged to be activated by poultry, whereupon a predetermined amount of water will be dispensed to each bird.

Another object is to provide a drinking fountain having a plurality of spouts for dispensing water to poultry, and valves mounted for up-and-down movement in said spouts and arranged to close the latter when said valves are in their normal or lowermost position, as well as when they are pushed up by the drinking poultry to the end of their upward travel.

A further object of the invention is to provide a device of the character described having a plurality of spouts arranged to dispense water to poultry and to be automatically flushed after each dispensation.

A further object is to provide a poultry watering device having a water supply and regulating unit easily mountable on, or removable from, said device.

A still further object is to provide a drinking fountain of the character described which is sanitary in all respects, well designed structurally and adaptable to poultry yard conditions, and relatively low in manufacturing cost.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a sectional view of the poultry watering device of my invention, parts being shown in section and portions being omitted to reduce the size of the figure.

Figure 2 is a sectional view of the device taken on the line 2—2 of Figure 1.

Figure 3 is a side elevation of a portion of the device of the invention.

Figure 4 is a sectional view of the structure taken on line 4—4 of Figure 3.

Fig. 5 is a side view of the fountain on a very small scale.

The matter of properly watering poultry has long been a practical problem. Usually the watering has been effected by providing pans or troughs filled with water. Such method however, is extremely unsanitary and not conducive to satisfactory drinking. The unsanitary feature, as may be readily surmised, is due to the exposed condition of the water and the use thereof by all the poultry having access to same. The unsatisfactory drinking is occasioned by the fact that the poultry are forced to dip their beaks into water and then raise their heads to enable the water to pass down their throats, the water in most instances being at least partially spilled during the raising action. In accordance, however, with my invention the water is never exposed prior to the drinking operation, the poultry may go through the entire drinking operation with their heads elevated, and each bird is watered from an individual drinking source.

The watering device in the preferred embodiment of my invention comprises a water container here shown in the form of a horizontally extending trough 5 arranged to be held elevated from the ground by means of standards, 3 and 4, insertable into the hollow members 6 which latter are rigidly attached to the trough. In order to provide a drinking fountain of adjustable height so as to be adapted for watering different sizes of poultry, the members 6 have a plurality of openings 7 designed to register with openings in the standards, so that bolts or screws may be inserted in said openings to hold the trough at a desired distance from the ground.

Filling of the container 5 with water may be effected either by simply pouring water through an opening 8 provided in an end of the trough, or more conveniently by having an automatic supply and regulating unit 9 which may be easily mounted on the trough or dismounted therefrom. A convenient form of the unit 9 operatively associated with the trough is shown in section in Fig. 1, while in Figure 3 a side elevation of the unit removed from the rest of the structure is given. With reference to these figures it is seen that water reaches the inside of the container 5 through a relatively narrow passage 11 which is defined in the vertical portion 12 of the unit 9 and contains two ball valves 13 and 14. To insure uniform wear both balls are arranged to be free so as to engage their respective seats with different portions of the spherical surfaces. The lower ball 13 is actuated by a rod 15 which freely rests on the shorter end of a lever arm 16 of a float 17 of the usual type. It is thus clear that when the float is lowered due to lack of water in the trough, the rod 15 is forced upwardly lifting the ball 13 which in turn imparts an upward movement to the upper ball 14. Consequently both balls disengage their seats nearly simultaneously and thus allow water to refill the trough. The inflow of water lifts the float 17 and allows the balls 13 and 14 and the rod 15 to return by gravity to their normal positions.

The provision of two balls is an important feature of the device of my invention since it often happens that a ball valve is prevented from tightly engaging its seat due to a small piece of rock or other substances brought along with water and jammed between the valve and its seat. In a watering device provided with only one valve, such an accident is invariably followed by an overflow and the consequent waste of water. It is obvious that with the present arrangement the over-flow will be caused only if both ball valves are simultaneously impaired, which is highly improbable.

As is clearly illustrated in Figure 1 the portion 12 in its upper part widens into a horizontal circular portion 18 to which a cap 19 is clamped, the two members thus defining a chamber 21 communicating with the passage 11 and housing a filtering screen 22. The function of the screen 22 is to prevent any of the impurities carried by the water from entering the passage 11. For this purpose the edges of the screen are secured in an annular groove 23 provided along the inner walls of the portion 18. To provide for easy disassembling the cap 19 is fastened to the portion 18 by screws 24 which pass through the lugs 25 and 26 provided on the cap and the portion 18 respectively. These screws are in threaded engagement with the lugs 26 but have a sliding fit with the perforations in the lugs 25. To insure water tight engagement of the members and at the same time to provide for expansion of water inside the chamber 21 as when the water freezes, relatively stiff helical springs 27 are positioned around the screws 24 and between the heads of the latter and the lugs 25 thus resiliently holding the cap 19 down.

Water is supplied to the chamber 21 through a hose 28 and a horizontal passage 29 defined by a tubular extension 31 of the cap 19. An intimate and water-tight connection between the extension 31 and the hose is conveniently effected by providing a relatively wide annular groove 32 on the tubular extension 31 and by tightly pressing into said groove the inner walls of an end of the resilient hose 28. To insure a perfect contact between the hose 28 and the extension 31, and to hold the two members in fixed relation to each other, a clamp member 33 is provided.

A preferred form of this member is well illustrated in Figure 4. As there shown, the member 33 comprises a resilient forked part 34 shaped to snugly embrace the outside of the hose 28, and a support member or lug 35 arranged to be inserted into the hollow of one of the members 6 so as to removably support the whole unit 9 in a predetermined relation to the rest of the structure. Clearly the lug 35 may be made in a number of ways, but to be conveniently associated with the comparatively light structure of the device of my invention the lug is preferably made of sheet metal. Thus, as is shown in Figure 4, a strip of sheet metal may be stamped to serve as the bottom and two walls of the lug, while the ends of the strip would provide the forked parts 34 referred to above and two ears 36 perforated to receive a screw 37 which serves as a tightening means for the clamp. To render the structure of the plug more rigid, side pieces 38 preferably also of sheet metal are soldered to the walls of the lug.

To obviate the possibility of over-filling the container and the consequent spilling of water, an over-flow means 39 is provided at some suitable point of the bottom 41 of the trough. As is illustrated in Figure 1, said overflow means is conveniently combined with the drainage system of the trough by having a pipe 42 removably inserted into the trough-draining conduit 43. It is thus seen that the overflow means 39 serves simultaneously as a stop to the conduit 43, and that by simply removing the pipe 42, the trough is thoroughly flushed.

As is readily surmised, the most important structural details of the device of my invention are those dealing with the dispensation of drinking water to poultry. A preferred form of the dispensing apparatus is illustrated in Figs. 1 and 2 and comprises a plurality of spouts 44 projecting downwardly through the openings 45 in the bottom 41 of the container 5. These spouts are conveniently made in the form of hollow cylinders 46, their upper ends being provided with flanges 47 arranged to rest on the upwardly protruding annular portions 48 which define the openings 45. To prevent leakage the cylinders 46 are preferably soldered to the inner walls of the portions 48. Consequently water may escape from the container only through passages 49 defined within the cylinders 46, and its flow may thus be conveniently regulated by providing within said passages valves 51. The latter, as is clearly shown in Figs. 1 and 2, comprise stems 52 disposed axially of the passages 49 and provided at their upper and lower extremities with stops 53 and 54 respectively. The upper stops 53 have conically shaped valve surfaces 55 arranged to engage the upper edges of the passages 49 when the valves are in their normal or closed position and thereby to prevent water from escaping from the container. The lower stops 54 are preferably of spherical shape so as to be conveniently held in the beaks of the poultry while the latter are engaged in the act of drinking. To allow of an upward movement of the valves 51, the lower stops 54 are affixed to stems at a point somewhat below the lower extremity of cylinders 46. This provision permits water to escape from the passages 49 into the mouths of the poultry when the latter elevate the valves and thus disengage the conical surfaces from the edges of the passages 49. It is noted, however, that the travel of the valves is comparatively short, since a very slight upward push of the valves by the drinking poultry causes the stops 54 to come into contact with the edges of the lower ends of the cylinders 46 and thus to close the passages 49. Consequently with each operation of the valve an amount of water determined by the total travel of the valve, and therefore easily controllable by the designer, will be dispensed to the drinking bird.

The above feature of dispensing a predetermined amount of water is of the utmost importance in connection with the drinking fountains of the type described, since the birds using these fountains receive water from spouts located above their heads instead of drinking from pans or troughs positioned on the ground. In the latter case each bird takes in its mouth just the amount of water which it can comfortably swallow by elevating its head and letting the water run freely down its throat. Apparently no control can be exercised by a bird over the passage of water down its throat when the latter is in nearly vertical position. It is consequently clear that unless a predetermined amount of water is automatically dispensed to each bird receiving water from above its head, the bird may choke, or at best a certain amount of water will be spilled and wasted.

Besides controlling the dispensation of water, the valves associated with the device of my invention possess another feature of advantage, namely that of self-flushing. The latter process takes place automatically after the bird having received the required amount of water releases the valve. The latter by the action of gravity resumes its normal position, some water, however, escaping through the passage 49 during the downward travel of the valve. This stream of water flowing down the stem and lower stops 54 effectively washes the latter members.

A receptacle for water escaping from the container 5 during the flushing action described above or otherwise is conveniently provided by a relatively narrow drain pan 55 positioned directly below the spouts 44 and provided with a sloping bottom 56 to convey the water down to a discharge pipe 57 which latter may lead to a bucket or be connected to some drainage system. In order to prevent poultry from drinking water in the drain pan 55, and also to prevent the water escaping from the trough from spilling, the drain pan 55 is provided with a removable drain trough of substantially the same length as the pan 55 and arranged to be positioned longitudinally over the pan when operatively disposed. In the present embodiment, the drain trough 58 comprises a deflector member 59 in the form of two strips 61 of sheet metal or such arranged to define a flat-sided funnel converging into the drain pan 55. As is clear from Figure 2, the upper edges of the strips 61 are bent on themselves thus forming smoothly rounded terminals so as to cause water splashed on said edges to flow on the under sides of the strip 61. To allow water running downwardly along either upper or under surfaces of the strips 61 to escape into the drain pan 55 the lower edges 62 of the strips are spaced from each other and from the sides of the drain pan. Joining of the strips 61 and supporting them over the pan 55 is conveniently effected by providing a plurality of spacers 63 preferably soldered to the lower ends of the strips 61. The edges of the spacers are tapered and arranged to resiliently engage the sides of the pan 55 thus providing a structure amply rigid and at the same time possessing the advantage of being easily disassembled for cleaning or repairs. It is now noted that the deflector member 59 is positioned directly below the draining conduit 43 so as to allow of a thorough washing of the strips 61 and the pan 55 by simply opening the conduit 43 and letting the water contained in the trough 5 flush the parts below.

To render the drinking fountain of my invention entirely sanitary, a roof 64 is provided over the container and a means associated therewith whereby poultry is prevented from roosting on said roof and contaminating the container or the water therein. As is illustrated in Figs. 1 and 2, said means comprises a member 65 loosely hinged on the ridge 66 of the roof 64. To make the preventing means especially effective the member 65 is made angular so as to allow of a greater swing of the member between the contacts of its sides with the corresponding sloping portions of the roof 64. With this arrangement, it is obviously impossible for a bird to remain on the roof for any length of time since under the weight of the bird the member 65 will be tilted into the position shown in Figure 2 and the bird will slide down the now sloping part 67 of the member 65.

It will now be clear that with the use of my invention the aforementioned objects are obtained, and especially will it be evident that a predetermined amount of water is dispensed to each bird individually in a manner especially conducive to satisfactory drinking, and that the water in the drinking fountain of my invention is completely protected from contamination while the dispensing apparatus will be automatically flushed.

I claim:

1. A domestic fowl drinking fountain, comprising a container for holding water which is provided with an outlet immovably fixed thereto, a movable valve element seating on top of the outlet to control the flow of water through the outlet, a stem serving to operate the valve element and arranged within the outlet and extending to the exterior of the container, the water flowing down the stem when the valve element is open, said stem having a part of a shape and size to be received in the beak of the fowl and being arranged to be lifted by the fowl to open the valve, and means for supporting the container at such an elevation above the body of the fowl that the fowl retains its neck in a raised position when drinking so that the water will flow down such neck.

2. A domestic fowl drinking fountain, comprising a container for holding water which is provided with an immovable outlet, a valve element seated on top of the outlet to cover said outlet and movable upwardly when opening, a stem fixedly connected with the valve element to move the same and arranged within the outlet and extending to the exterior of the container, the water flowing down the stem when the valve element is open, said stem having a part of a shape and size to be received in the beak of the fowl to permit lifting of the stem and valve by the fowl, and means for supporting the container at such an elevation above the body of the fowl that the fowl retains its neck in a raised position when drinking so that the water will flow down such neck.

3. A domestic fowl drinking fountain, comprising a container for holding water, a tubular outlet element immovably connected with the container, a valve element seated on top of the tubular outlet for controlling the flow of water through the tubular outlet element, a stem serving to operate the valve element and arranged within the tubular outlet element and extending outwardly beyond the same, the water flowing down the stem when the valve element is open, said stem having a part of a shape and size to be received within the beak of the fowl to permit lifting of the valve and stem by the fowl, and means for supporting the container at such an elevation above the body of the fowl that the neck of the fowl is in the raised position when drinking so that the water will flow down such neck.

4. A domestic fowl drinking fountain, comprising a container for holding water, an outlet tube for the container fixed in the bottom thereof, a gravity operated valve element covering the top of the outlet tube and movable upwardly to the open position, a stem secured to the valve element and extending through the outlet tube and projecting below the same, there being a space between the stem and outlet tube so that the water flows down said stem, an enlarged element secured to the lower end of the stem and of a shape and size to be received within the beak of the fowl and also adapted to engage with the outlet end of the outlet tube to close the same, and means for supporting the container at such an elevation above the body of the fowl that the neck of the fowl is raised during drinking, so that the water may flow down the neck of the fowl.

5. A domestic fowl drinking fountain, comprising a container for holding water, a generally vertical outlet tube for the container fixed in the bottom thereof, a movable valve to cover the upper end of the outlet tube, a reciprocatory stem extending through the outlet tube and serving to operate the valve, said stem co-acting with the outlet tube to provide a passage between them, a spherically curved part arranged exteriorly of the outlet tube and of a size to enter the beak of the fowl and for holding a drop of water of a maximum size, said curved part forming a closure for the tube when raised by the fowl and means for supporting the container at such an elevation above the body of the fowl that the fowl retains its neck in a raised position when drinking so that the water will flow down such neck.

6. A domestic fowl drinking fountain, comprising a container for holding water, a generally vertical outlet tube for the container, a reciprocatory stem extending through the tube and having a part arranged exteriorly of and below the tube, said part being of a shape and size to be received within the beak of the fowl and to form a closure for the lower end of the outlet tube upon being raised by a fowl, said stem and outlet tube having their telescoping portions of a substantial length and correlated to produce a passage between them so that the water travels down the stem to said part, a valve element carried by the upper end of the stem to cover and uncover the upper end of the outlet tube, and means for supporting the container at such an elevation above the body of the fowl that the fowl retains its neck in a raised position when drinking so that the water will flow down such neck.

In testimony whereof, I have hereunto set my hand at Oakland, California, this 31st day of July, 1929.

STEWART WYSONG.